W. GATER.
APPLIANCE SUITABLE FOR LIFE SAVING AT SEA.
APPLICATION FILED APR. 2, 1914.
1,132,468.
Patented Mar. 16, 1915.
2 SHEETS—SHEET 1.
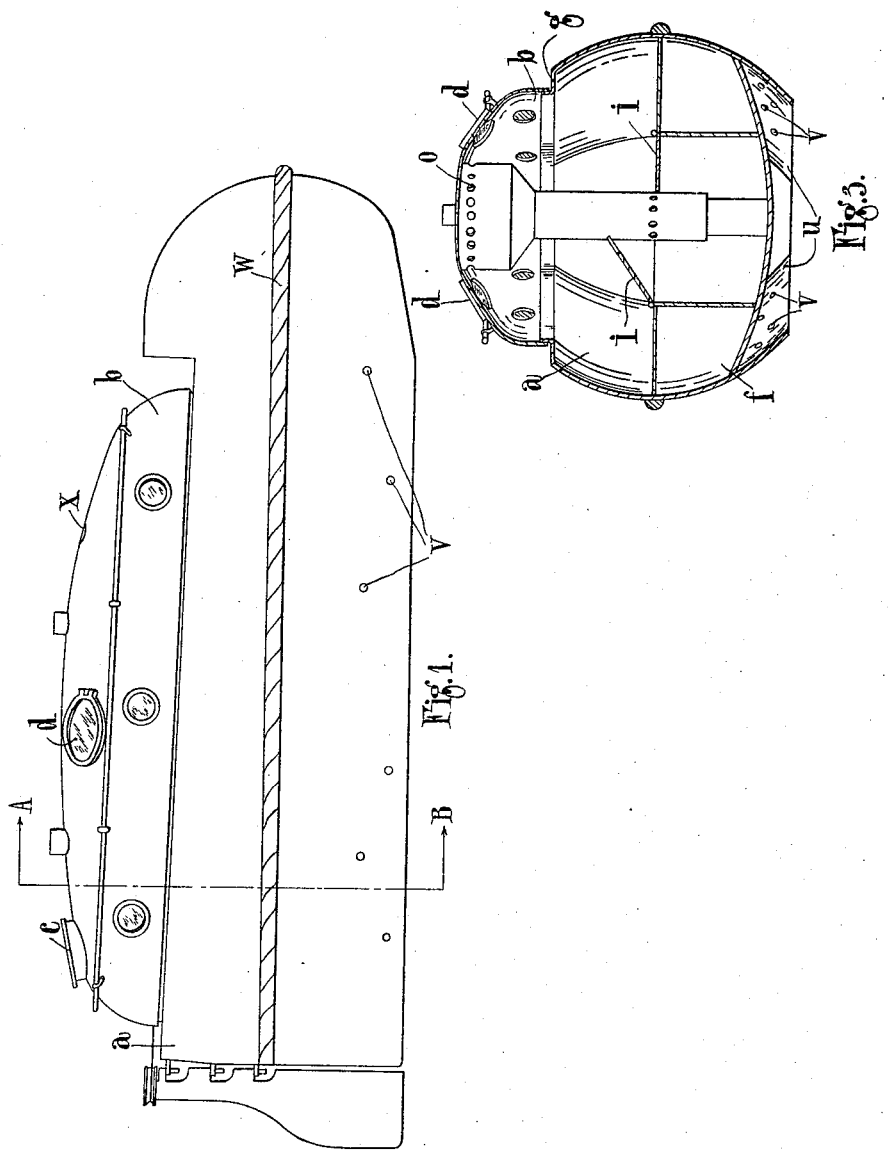
WITNESSES
INVENTOR
William Gater
BY
ATTORNEYS W. GATER.
APPLIANCE SUITABLE FOR LIFE SAVING AT SEA.
APPLICATION FILED APR. 2, 1914.
1,132,468.
Patented Mar. 16, 1915.
2 SHEETS—SHEET 2.
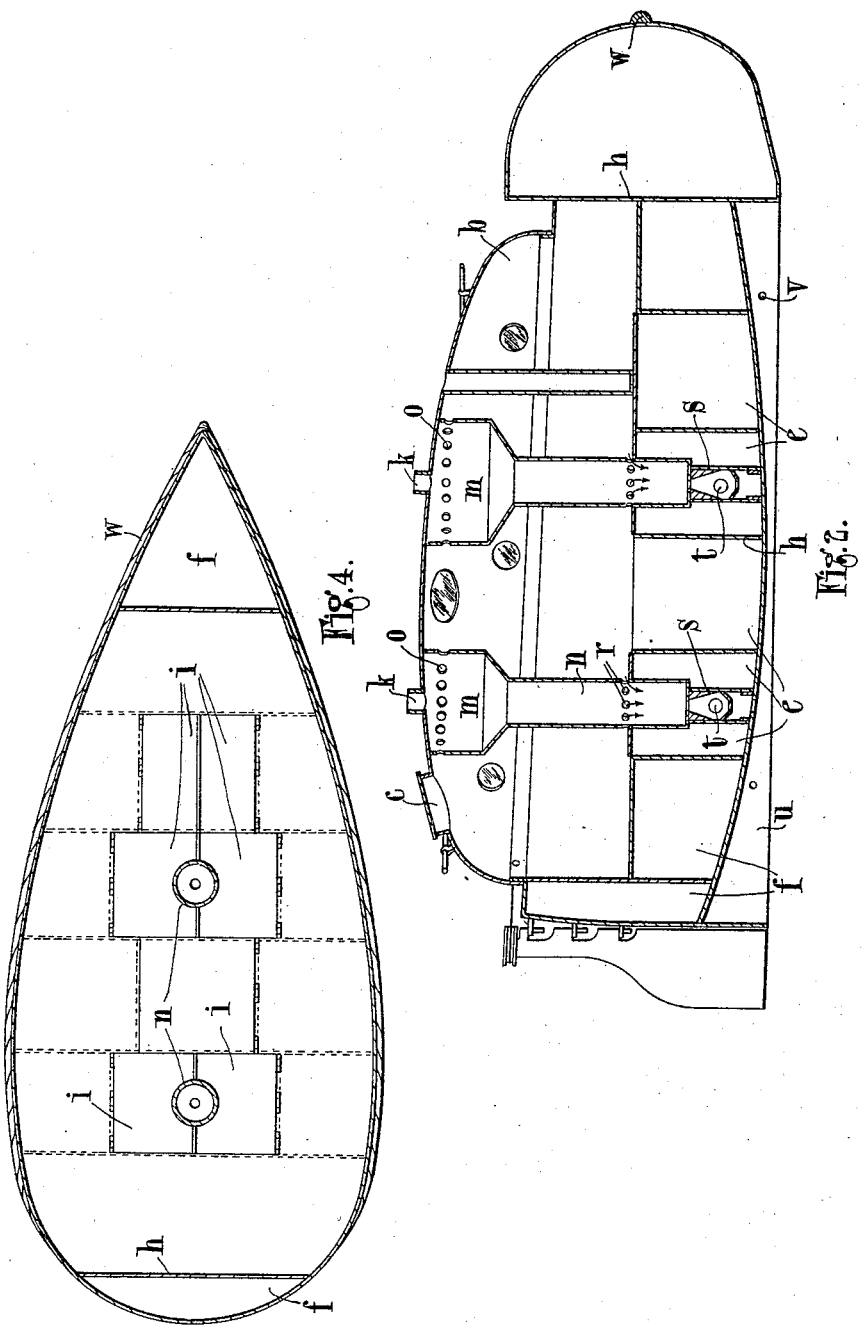

UNITED STATES PATENT OFFICE.

WILLIAM GATER, OF SHANGHAI, CHINA.

APPLIANCE SUITABLE FOR LIFE-SAVING AT SEA.

1,132,468. Specification of Letters Patent. Patented Mar. 16, 1915.

Application filed April 2, 1914. Serial No. 829,159.

*To all whom it may concern:*

Be it known that I, WILLIAM GATER, a subject of the King of Great Britain and Ireland, and residing at 22 Rue Eugene Bard, Shanghai, China, have invented certain new and useful Improvements in and Relating to Appliances Suitable for Life-Saving at Sea, of which the following is a specification.

The invention relates to appliances suitable for life-saving at sea and apart from the general structure of such appliances relates especially to the ventilating and draining arrangements.

Referring to the accompanying drawings, which are of a diagrammatic nature, Figure 1 shows a side elevation of a boat-shaped buoy according to the present invention; Fig. 2 shows a longitudinal section, and Fig. 3 a transverse section on the line A—B of Fig. 1, while Fig. 4 is a plan of the lower division of the buoy showing arrangement of compartments.

In carrying the invention into effect according to one form, the life-saving appliance is formed as a roughly boat-shaped buoy and consists of upper and lower divisions or chambers, $a$ and $b$, the upper chamber being preferably dome-shaped as shown, and being provided with a hinged door, $c$, or the like for access to its interior, and with port holes, $d$, arranged in any suitable manner. The upper part has preferably such a relation to the lower as to provide a ledge, $g$, along which a man can walk.

The lower chamber may be formed of a series of center compartments, $e$, surrounded by a series of outer compartments, $f$, divided from one another by suitable partitions, $h$, preferably breaking joint with one another. The outer compartments, $f$, may be filled with cork or other material to add to the buoyancy of the buoy, while the inner compartments, $e$, may be utilized for the storage of food and so forth.

The floor of the upper or living chamber, $a$, may be formed in part of hinged flaps, $i$, corresponding with the compartments to which access is desired.

In the drawings, a pair of ventilators are shown, one of which will now be described by way of example.

An aperture, $k$, is provided in the upper part of the dome-shaped shell, this aperture being controllable as desired, by a suitable shutter or the like. Below the air inlet, $k$, a cup-shaped device, $m$, is arranged, open at the top and provided it may be integrally with a drainage pipe, $n$, leading from its lower part downwardly through the bottom of the buoy. The rim or edge of the cup which is in close proximity to the outer shell is provided with a series of holes, $o$, $o$, as indicated, for the passage of air, any water that may find its way into the air inlet through the top of the buoy passing into the cup and out through the passage described.

In case any water should enter the living chamber, holes, $r$, $r$, are formed through the wall of the pipe, $n$, preferably just above the level of the floor for drainage purposes, the buoy being so designed as a whole that the level of the floor of the living chamber is above the level of the water in which the buoy floats.

The pipe or passage, $n$, for draining-off water may also be provided with a non-return device such as a conical constriction, $s$, below the level of the floor, and with the smaller end uppermost, a ball, $t$, of cork or other suitable material being placed within the cone so that it may be readily floated up and close the passage, thus preventing surges of water up the pipe.

The lower part of the buoy is preferably formed of a chamber which is convex downward, and may be provided with straps of steel or the like (not shown) suitably arranged, provided at their free ends with hooks, eyes, or other such devices by means of which the buoy as a whole can be slung.

Around the lower part of the buoy a protective screen, $u$, of a form to correspond with the buoy is arranged projecting below its lowest point, the screen being provided with a series of holes, $v$, $v$, to allow any trapped air to escape when the buoy is floated.

At a convenient distance above the water level, a fender, $w$, of rope or other suitable material is arranged around the buoy to prevent damage, while if desired a socket, $x$, or the like is provided in which a mast may be stepped.

The buoy as a whole may be built of any convenient material preferably steel, while it is so designed as regards form and dimensions that it is self-righting and will float only in the upright position.

The buoy may also be provided if desired with a warning bell or lamp.

It will be seen that a buoy-like appliance of the nature described may be very conveniently handled and will float without danger of capsizing in a rough sea for an indefinite period.

Having now described my invention what I claim as new and desire to secure by Letters Patent is:—

1. A life-saving appliance comprising in combination an inclosed shell or hull having an air-inlet in its upper part; and a duct extending downwardly through the lower part of said shell, the upper part of said duct having a deep cup-shaped enlargement large in relation to said air-inlet and with its perforated rim portion in juxtaposition to the upper part of said shell around said air-inlet.

2. A life-saving appliance comprising in combination a shell or hull; a removable cover therefor having an air-inlet; and a duct extending downwardly through the lower part of said shell, the upper part of said duct having a deep cup-shaped enlargement large in relation to said air-inlet and with its perforated rim portion in juxtaposition to said cover around said air-inlet.

3. A life-saving appliance comprising in combination an inclosed shell or hull having an air-inlet in its upper part; a floor dividing said shell into upper and lower compartments, said floor being above the level of the medium in which the appliance floats; and a duct extending through said floor and through the lower part of said shell, the upper part of said duct having a deep cup-shaped enlargement large in relation to said air-inlet and disposed in juxtaposition to the upper part of said shell, said duct being provided with two sets of perforations, one of said sets being in the immediate neighborhood of the upper part of said shell and the other of said sets being immediately above said floor.

In testimony whereof I have signed my name to this specification in the presence of two subscribing witnesses.

WILLIAM GATER.

Witnesses:
  T. O. BURTON,
  WM. ARMSTRONG.

Copies of this patent may be obtained for five cents each, by addressing the "Commissioner of Patents, Washington, D. C."